United States Patent
Okuda (10) Patent No.: US 10,377,010 B2
(45) Date of Patent: Aug. 13, 2019

(54) MACHINE TOOL (71) Applicant: FANUC Corporation, Yamanashi (JP)

(72) Inventor: Shinji Okuda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/348,893

(22) Filed: Nov. 10, 2016

(65) Prior Publication Data
US 2017/0129066 A1 May 11, 2017

(30) Foreign Application Priority Data
Nov. 11, 2015 (JP) .................................. 2015-221546

(51) Int. Cl.
B23Q 17/24 (2006.01)
B21D 19/00 (2006.01)
(Continued)

(52) U.S. Cl.
CPC ....... *B23Q 17/2471* (2013.01); *B21D 19/005* (2013.01); *B23H 9/02* (2013.01);
(Continued)

(58) Field of Classification Search
CPC .......... B24B 9/00; B24B 49/12; B25J 9/1697; B25J 11/006; B23Q 17/20;
(Continued)

(56) References Cited

U.S. PATENT DOCUMENTS 5,745,593 A * 4/1998 Wahawisan .......... G01R 31/311
382/146
5,761,390 A * 6/1998 Koshishiba ............ B25J 9/1679
700/250
(Continued)

FOREIGN PATENT DOCUMENTS

GB 2059536 A * 4/1981 ............. B23D 79/00
JP 5-165509 A 7/1993
(Continued)

OTHER PUBLICATIONS

Office Action in JP Application No. 2015-221546, dated Sep. 12, 2017, 8 pp.

*Primary Examiner* — Crystal J Barnes-Bullock
(74) *Attorney, Agent, or Firm* — Hauptman Ham, LLP (57) ABSTRACT

A machine tool of the present invention includes: a visual sensor that takes an image of unworked workpiece; an unworked workpiece shape information storing unit that stores unworked workpiece shape information obtained by the visual sensor; a worked workpiece shape information storing unit in which worked workpiece shape information is stored; a burr information calculating unit that recognizes a burr by comparing the unworked workpiece shape information with the worked workpiece shape information; a burr determining unit that determines the burr based on conditions including at least one of the location and the direction of the burr in the workpiece; a working method judging unit that decides whether or not to perform burring with a tool of the machine tool based on the determination result concern- (Continued)

ing the burr; and a working path generating unit that generates a working path for removing the burr judged to be a burr on which burring is to be performed with the tool.

6 Claims, 4 Drawing Sheets

(51) Int. Cl.
  *B23Q 17/20* (2006.01)
  *B24B 9/00* (2006.01)
  *B23H 9/02* (2006.01)
  *B24B 49/12* (2006.01)
  *B25J 11/00* (2006.01)
  *B25J 9/16* (2006.01)
  *G05B 19/401* (2006.01)

(52) U.S. Cl.
  CPC ........... *B23Q 17/20* (2013.01); *B23Q 17/249* (2013.01); *B24B 9/00* (2013.01); *B24B 49/12* (2013.01); *B25J 9/1697* (2013.01); *B25J 11/006* (2013.01); *G05B 19/401* (2013.01); *G05B 2219/37208* (2013.01); *G05B 2219/45151* (2013.01)

(58) Field of Classification Search
  CPC .... B23Q 17/2471; B23H 9/02; B21D 19/005; B23D 79/00; G05B 19/402; G05B 19/4097; G05B 2219/35134; G05B 2219/37208; G05B 2219/45151; G01B 11/04
  See application file for complete search history.

(56) References Cited

U.S. PATENT DOCUMENTS

| | | | | |
|---|---|---|---|---|
| 6,155,757 | A * | 12/2000 | Neumann | B23K 26/361 409/131 |
| 6,212,930 | B1 * | 4/2001 | Skrabs | B21D 19/005 72/336 |
| 7,023,564 | B2 * | 4/2006 | Jagiella | G01N 21/892 356/237.1 |
| 7,534,077 | B2 * | 5/2009 | Ban | G05B 19/4163 318/568.16 |
| 8,872,913 | B2 * | 10/2014 | Wang | G05B 19/4015 348/95 |
| 8,882,986 | B2 * | 11/2014 | Luo | B23H 3/00 204/228.7 |
| 9,724,801 | B2 * | 8/2017 | Gu | B24B 49/16 |
| 10,005,186 | B2 * | 6/2018 | Watanabe | B25J 15/0061 |
| 2011/0228050 | A1 * | 9/2011 | Wang | G05B 19/4015 348/46 |
| 2013/0203320 | A1 * | 8/2013 | Ghalambor | B24C 1/083 451/2 |
| 2015/0005923 | A1 * | 1/2015 | Gu | B24B 49/16 700/164 |
| 2016/0346892 | A1 * | 12/2016 | Bhapkar | B23Q 17/20 |
| 2017/0282258 | A1 * | 10/2017 | Ohno | B23B 51/101 |

FOREIGN PATENT DOCUMENTS

| | | | | |
|---|---|---|---|---|
| JP | 6-210544 | A | | 8/1994 |
| JP | 7-104829 | A | | 4/1995 |
| JP | 7-121222 | A | | 5/1995 |
| JP | 09070742 | A * | 3/1997 | ............. B24B 9/00 |
| JP | 2002-126928 | A | | 5/2002 |
| JP | 2007-21634 | A | | 2/2007 |
| JP | 2014-75050 | A | | 4/2014 |
| JP | 2016150428 | A * | 8/2016 | ............. B23Q 15/24 |

* cited by examiner

BURR ON WORKPIECE TOP FACE
(Z-AXIS DIRECTION)

FIG. 4B

BURR ON WORKPIECE SIDE FACE
(X- OR Y-AXIS DIRECTION)

FIG. 4C

BURR ON LOWER FACE IN Z-AXIS DIRECTION
(UNDERCUT)

FIG. 4D

BURR OUTSIDE MOVABLE RANGE OF TOOL

FIG. 5

MACHINE TOOL

RELATED APPLICATIONS

The present application claims priority to Japanese Patent Application Number 2015-221546, filed Nov. 11, 2015, the disclosure of which is hereby incorporated by reference herein in its entirety.

BACKGROUND OF THE INVENTION

1. Field of the Invention

The present invention relates to a machine tool and, in particular, to a machine tool that controls a working path for removing a burr from workpiece.

2. Description of the Related Art

In individual pieces of workpiece, burrs which are different from one another in units of millimeters often appear. For this reason, when burring is performed on workpiece by using a machine tool, a program is created with reference to a piece of workpiece in which the largest number of burrs have appeared. In this case, in working which is performed on a piece of workpiece in which less burrs have appeared than the piece of workpiece used as reference workpiece, air cut (idle operation) is frequently performed, resulting in wasted time in which working is not performed.

Furthermore, depending on the location or direction in which a burr has appeared, it is difficult to perform burring from the main axis direction of the machine tool. In such a case, it is necessary to perform burring by tilting the workpiece by using an additional axis table, perform burring in another process by executing a tooling change, or perform burring manually.

On the other hand, as a prior art technique of performing burring, in Japanese Patent Application Laid-Open No. 2007-021634, Japanese Patent Application Laid-Open No. 07-104829, and Japanese Patent Application Laid-Open No. 07-121222, for example, techniques of automating burring by using a robot by generating a working path from the information obtained by a visual sensor are disclosed. In general, since a robot has a higher degree of flexibility in operation than a machine tool, the robot relatively easily performs working on burrs that have appeared in various locations and directions.

However, in the techniques disclosed in Japanese Patent Application Laid-Open No. 2007-021634 and Japanese Patent Application Laid-Open No. 07-121222, a robot can hold only a small tool and the torque of the robot that can withstand working is low. As a result, it is necessary to ease working conditions in an area in which a large burr has appeared, which undesirably lengthens the working time. Moreover, working becomes impossible depending on the dimensions of a burr.

In addition, in the technique disclosed in Japanese Patent Application Laid-Open No. 07-104829, a robot can select a tool and working conditions in accordance with the dimensions of a burr. Here, the robot has to use a tool whose diameter is larger than the dimensions of a burr. However, the larger the tool becomes, the worse the working conditions become, which undesirably lengthens the working time. Moreover, working becomes impossible depending on the dimensions of a burr.

SUMMARY OF THE INVENTION

An object of the present invention is accordingly to provide a machine tool that can check the circumstances under which a burr has appeared by using a visual sensor and determine whether or not the burr is a burr on which working can be performed from the main axis direction and, preferably, can make a robot take partial charge of burring for a burr on which working cannot be performed from the main axis direction.

According to one embodiment, a machine tool that performs burring on unworked workpiece in which a burr has appeared includes: at least one visual sensor that takes an image of the unworked workpiece; an unworked workpiece shape information storing unit that stores unworked workpiece shape information obtained by using the at least one visual sensor; a worked workpiece shape information storing unit in which worked workpiece shape information is stored; a burr information calculating unit that recognizes a burr by comparing the unworked workpiece shape information stored in the unworked workpiece shape information storing unit with the worked workpiece shape information stored in the worked workpiece shape information storing unit; a burr determining unit that determines the burr based on conditions including at least one of the location and the direction of the burr in the workpiece; a working method judging unit that decides whether or not to perform burring with a tool of the machine tool based on a determination result concerning the burr; and a working path generating unit that generates a working path for removing the burr judged to be a burr on which burring is to be performed with the tool.

According to another embodiment, the burr determining unit may determine the burr based on the conditions further including at least one of the dimensions of the burr and the movable range of the tool.

According to another embodiment, the machine tool may further include a tool information storing unit that stores tool information including the shape and cutting conditions of the tool and a tool selecting unit that selects the tool which is used in burring based on the dimensions of the burr and the tool information, and the burr determining unit may determine the burr based on the conditions further including the tool information of the selected tool.

According to another embodiment, the machine tool may further include a robot that is capable of performing burring and the working method judging unit may decide whether to perform burring with the tool or to perform burring with the robot based on the determination result concerning the burr.

According to another embodiment, the machine tool may further include a tool information storing unit that stores tool information including the shape and cutting conditions of the tool and a tool selecting unit that selects the tool which is used in burring based on the dimensions of the burr and the tool information, and the working path generating unit may generate a working path by calculating the number of cutting operations indicating how many times cutting operations are performed for working from the dimensions of the burr and the maximum cut amount of the selected tool.

According to another embodiment, the machine tool may take images of the workpiece by the at least one visual sensor from two or more directions.

According to another embodiment, the at least one visual sensor may include a plurality of visual sensors and the machine tool may take images of the workpiece from two or more directions by making the plurality of visual sensors take images of the workpiece from different directions.

According to another embodiment, the at least one visual sensor may be installed in a robot and take images of the workpiece from two or more directions by changing the position of the robot.

According to the present invention, it is possible to discriminate between a burr on which working can be performed by the machine tool from the main axis direction thereof and a burr on which working cannot be performed by the machine tool from the main axis direction. This makes it possible to devise creative ways such as making the machine tool perform working only on a burr on which working can be performed from the main axis direction and performing working on the other burrs by the other methods and thereby improve the efficiency of the entire burring process.

That is, when a burr has appeared in directions other than the main axis direction or a burr is present in a location outside the tool movable range even if the burr is a burr in the main axis direction, an attempt to perform burring only with the machine tool makes it necessary to change the position of the workpiece by an additional axis table or perform working in another process after changing the orientation of the workpiece and securing the workpiece again. On the other hand, by not performing burring with the machine tool in directions other than the main axis direction and burring outside the tool movable range and, preferably, making the robot perform these burring operations, working is completed in a single process without performing a change of the position of the workpiece, for example.

In general, the working efficiency of burring which is performed by the robot is lower than the working efficiency of burring which is performed by the machine tool. However, as compared to a reduction in efficiency caused by a change of the position of the workpiece or re-securing of the workpiece after a change of the orientation of the workpiece in the machine tool, reducing the number of working processes by making the machine tool and the robot take partial charge of burring by applying the present invention can contribute to an improvement in efficiency as a whole.

BRIEF DESCRIPTION OF THE DRAWINGS

These and other objects and features of the present invention will become apparent from the following description of exemplary embodiments with reference to the accompanying drawings in which.

DETAILED DESCRIPTION OF THE PREFERRED EMBODIMENTS

Hereinafter, embodiments of the present invention will be described with reference to the drawings.

When performing burring on workpiece, a machine tool according to the present invention obtains the three-dimensional model shape of workpiece which is an object on which burring is to be performed and analyzes the circumstances under which a burr has appeared by comparing the obtained three-dimensional model shape with product data which is registered in advance. Then, the machine tool selects a tool based on the shape of the workpiece and the analyzed circumstances under which the burr has appeared, generates a working path based on the selected tool, and performs burring.

First, functional units forming the machine tool according to the present invention will be described.

Figure 5:
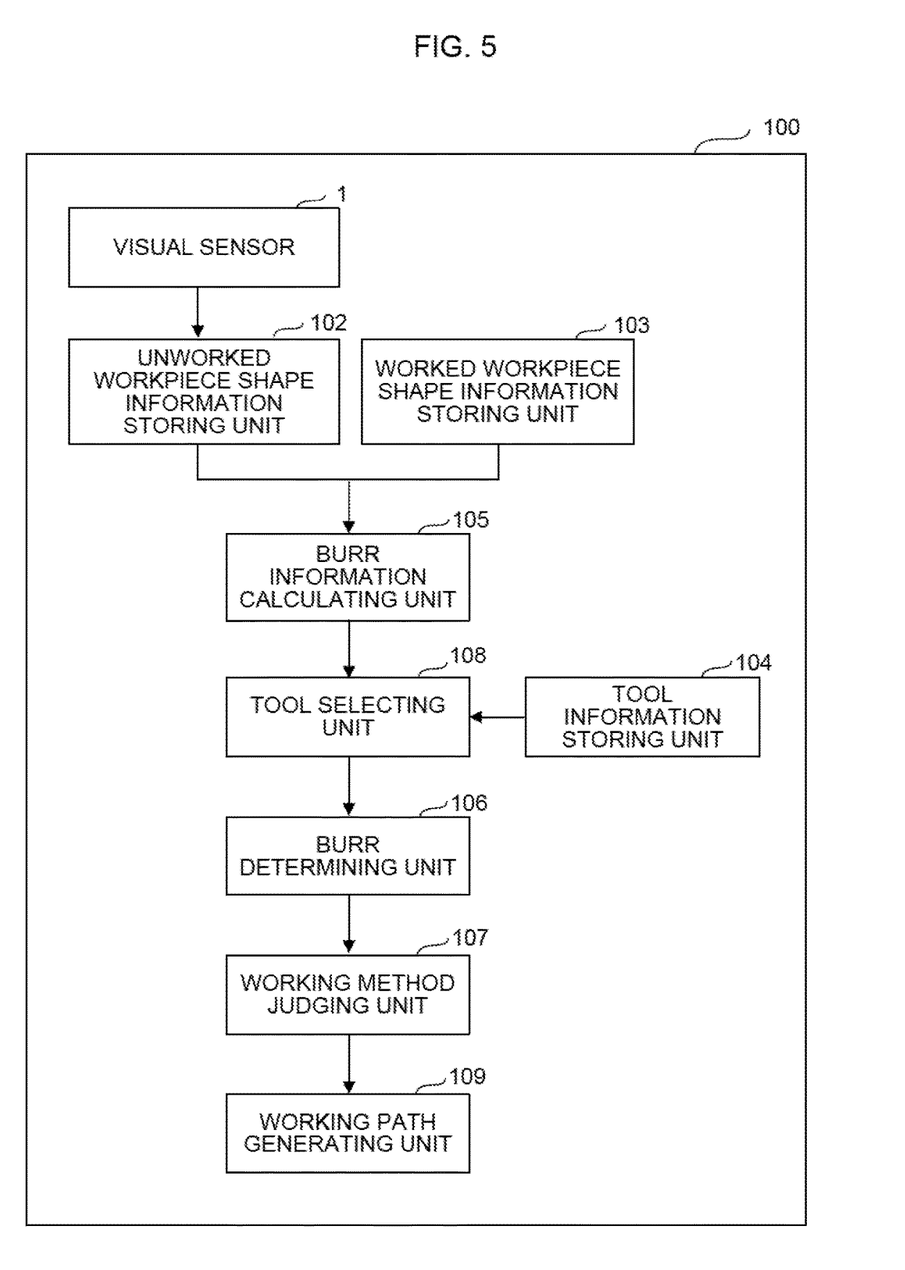
FIG. 5 is a block diagram depicting the configuration of a machine tool in the present invention.

As depicted in FIG. 5, a machine tool 100 includes a visual sensor 1, an unworked workpiece shape information storing unit 102, a worked workpiece shape information storing unit 103, a tool information storing unit 104, a burr information calculating unit 105, a burr determining unit 106, a working method judging unit 107, a tool selecting unit 108, and a working path generating unit 109. Hereinafter, the functions of the elements will be described in order.

<Regarding a Unit that Obtains the Circumstances Under which a Burr has Appeared in Workpiece>

In performing burring on workpiece, it is necessary to check the circumstances under which a burr has appeared. In the present invention, the circumstances under which a burr has appeared are recognized by comparing the shape of the workpiece on which burring has not yet been performed with the shape of the workpiece on which burring has been performed.

Figure 1:
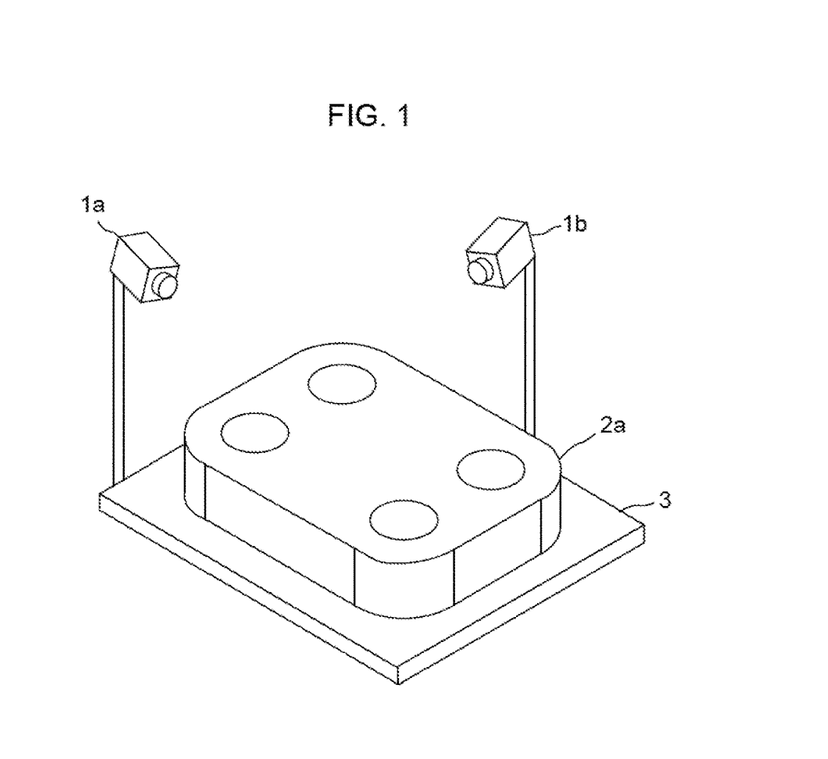
FIG. 1 is a diagram explaining how a workpiece shape is obtained by using two or more visual sensors in the present invention.
Figure 2:
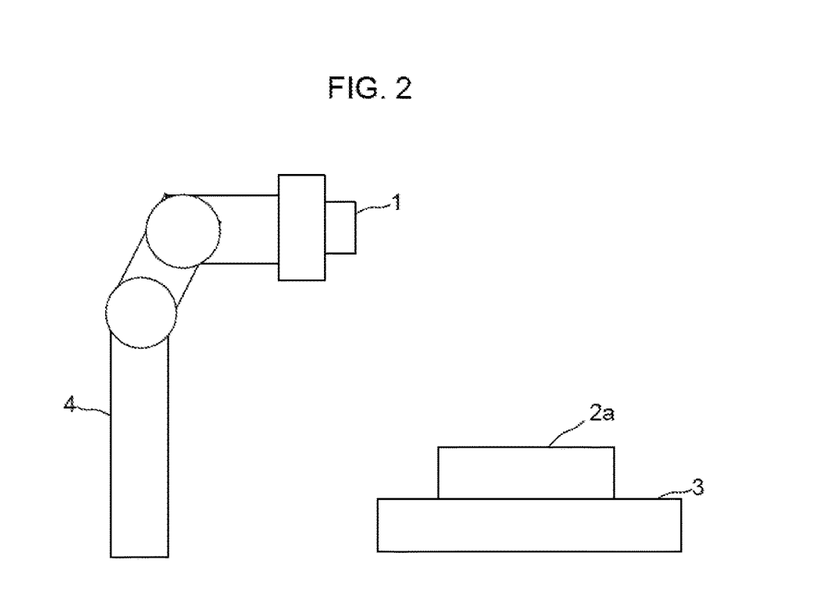
FIG. 2 is a diagram explaining how a workpiece shape is obtained by using a visual sensor attached to a robot in the present invention.

First, as depicted in FIG. 1, the visual sensors 1 (1a, 1b) such as cameras take images of finished workpiece 2a on which burring has been performed in advance, the finished workpiece 2a placed on a working jig 3 in the machine tool 100, from two or more directions and obtain shape information (worked workpiece shape information) of the finished workpiece 2a. As for the above-described two directions, images may be taken by two or more visual sensors 1 as depicted in FIG. 1 or images may be taken at a plurality of angles by using one visual sensor 1 attached to a robot 4 with a robot arm being controlled as depicted in FIG. 2. The worked workpiece shape information is recorded on the worked workpiece shape information storing unit 103 provided on memory of the machine tool 100. Incidentally, as the visual sensor 1, a shape measuring sensor other than a camera may be used.

Next, the visual sensors 1 take images of workpiece on which burring has not yet been performed, the workpiece placed on the working jig 3 in the machine tool 100, from two or more directions and obtain shape information (unworked workpiece shape information) thereof. The unworked workpiece shape information is recorded on the unworked workpiece shape information storing unit 102 provided on the memory of the machine tool 100.

Then, the burr information calculating unit 105 compares the unworked workpiece shape information stored in the unworked workpiece shape information storing unit 102 with the worked workpiece shape information stored in the worked workpiece shape information storing unit 103. Here, if a shape error between the two pieces of shape information is within error data which is set in advance in a measured error storage area provided on the memory of the machine tool 100, the burr information calculating unit 105 judges that a burr has not appeared. On the other hand, if the shape error exceeds the error data, the burr information calculating unit 105 judges that a burr has appeared.

If the burr information calculating unit 105 judges that a burr has appeared, the burr information calculating unit 105 outputs data (burr data) indicating the location on the unworked workpiece and the direction in which the burr has appeared and the width and the depth of the burr and stores the burr data in a burr data storage area provided on the memory of the machine tool 100. Here, the direction of a burr can be typically expressed based on the XYZ axes of a machine tool. In this specification, the embodiments will be described on the assumption that the main axis direction of the machine tool 100 is a Z axis and the directions perpendicular to the Z axis are X and Y axes. However, it goes without saying that the burr data is not limited to that described above and can be expressed by arbitrary parameters.

Incidentally, if burrs have appeared in a plurality of locations, data is divided into burr data 1 and burr data 2, for example, and then stored.

<Regarding the Tool Selecting Unit>

When burring is performed, it is desirable to select an appropriate tool in order to remove a burr. In the present invention, it is assumed that the machine tool 100 selects an appropriate tool used in burring based on the burr data indicating the width of a burr, the depth of the burr, the location of the burr, and so forth and the shape of the unworked workpiece.

For this purpose, it is assumed that the machine tool 100 according to the present invention stores in advance tool information (a tool diameter, a tool length, and cutting conditions) of each tool of a plurality of tools that are used in burring in the tool information storing unit 104 provided on the memory. Here, the cutting conditions are parameters such as the number of revolutions of a main axis, the feed speed, the width of cut, and the depth of cut.

The tool selecting unit 108 selects an appropriate tool from among the tool data stored in the tool information storing unit 104 in accordance with the burr data stored in the burr data storage area, that is, the information such as the width of a burr, the depth of the burr, and the location of the burr and, if necessary, with consideration given to the shape of the unworked workpiece.

An example of a tool selection method will be described. The tool selecting unit 108 first extracts, based on the location of a burr recorded on the burr data storage area, tools (for example, tools with large tool diameters, the tools which can perform working on a predetermined number of burrs or more at the same time) with tool diameters that allow the tools to perform working on the burr efficiently from the tool data stored in the tool information storing unit 104. Next, the tool selecting unit 108 selects a tool (a tool by which a load in working is reduced) with the smallest tool diameter from among the extracted tools.

Another example of the tool selection method will be described. The tool selecting unit 108 first extracts tools (for example, tools with large tool diameters, the tools which can perform working on a predetermined number of burrs or more at the same time) with tool diameters that allow the tools to perform working on the burr efficiently without interfering with the unworked workpiece from the tool data stored in the tool information storing unit 104 based on the location of the burr recorded on the burr data storage area and the shape of the unworked workpiece. Next, the tool selecting unit 108 selects a tool (a tool by which a load in working is reduced) with the smallest tool diameter from among the extracted tools.

Still another example of the tool selection method will be described. The tool selecting unit 108 first extracts tools with tool diameters that allow the tools to perform working on the burr without interfering with the unworked workpiece from the tool data stored in the tool information storing unit 104 based on the location of the burr recorded on the burr data storage area and the shape of the unworked workpiece. Next, the tool selecting unit 108 calculates loads which will be caused at the time of working from the cutting conditions of the extracted tools and the width of the burr and the depth of the burr of the burr data and selects a tool with the largest tool diameter whose calculated load is a predetermined value or smaller.

Incidentally, the machine tool 100 according to the present invention does not necessarily have to include the tool selecting unit 108 described above. In this case, the machine tool 100 performs burring by using an arbitrary predetermined tool.

<Regarding a Unit that Determines a Burr which is an Object on which Working is to be Performed>

Here, based on the location in which a burr has appeared and the dimensions of the burr in the XYZ-axes directions, the burr determining unit 106 determines whether the burr data indicates:

a burr in the Z-axis direction, that is, the top-face direction of the workpiece;

a burr in the X- or Y-axis direction, that is, the side-face direction of the workpiece;

a burr on a lower face in the Z-axis direction (an undercut location); or a burr that lies outside the movable range of a working tool and is present in a location to which the tool cannot reach.

Next, the working method judging unit 107 judges, of the stored burr data, a burr that is a burr in the Z-axis direction, that is, the top-face direction of the workpiece and is not a burr lying outside the movable range of the working tool and present in a location to which the tool cannot reach as a burr on which working can be performed by the machine tool 100. In other words, the working method judging unit 107 judges that only a burr in the Z-axis direction and within the movable range of the working tool is a burr on which working can be performed.

On the other hand, the working method judging unit 107 judges that burring is performed by a robot on a burr in the X- or Y-axis direction, that is, the side-face direction of the workpiece, a burr on a lower face in the Z-axis direction (an undercut location), and a burr that lies outside the movable range of the working tool and is present in a location to which the tool cannot reach. That is, the working method judging unit 107 judges that these burrs are burrs on which working is not performed by the machine tool 100.

Moreover, the working method judging unit 107 judges that, if a burr that has appeared in a location visible from the Z-axis direction, that is, the top-face direction of the workpiece, such as a hole or a notch which is provided in the Z-axis direction, that is, the top-face direction of the workpiece is present in a location in which working can be performed on the burr by the selected tool without interference with the unworked workpiece, the burr is a burr on which working can be performed by the machine tool 100. For example, since it is possible to perform working on a burr without interfering with the unworked workpiece if the tool diameter of the selected tool is smaller than the diameter of a hole or the width of a notch, the hole or the notch in which the burr has appeared, the working method judging unit 107 judges that working can be performed on the burr by the machine tool 100.

<Regarding the Working Path Generating Unit>

Then, the working path generating unit 109 generates a working path for burring that is used when the tool selected by the tool selecting unit 108 is used. Incidentally, if the machine tool 100 does not have the tool selecting unit 108, the working path generating unit 109 simply has to use an arbitrary predetermined tool and generate a working path by using the tool data of that tool.

The working path generating unit 109 can generate a working path for burring by performing a common working simulation or the like based on the location, length, and so forth of the burr. In addition thereto, in the present invention, the working path generating unit 109 can calculate how many times cutting operations have to be performed in the diameter direction of the tool by comparing the width of the burr judged by the working method judging unit 107 to be a burr on which working can be performed with the greatest width of cut in the tool data of the tool which is selected as a tool to be used. In addition thereto, the working path generating unit 109 can calculate how many times cutting operations have to be performed in the depth direction of the tool by comparing the depth of the burr in the burr data, the burr judged by the working method judging unit 107 to be a burr on which working can be performed, with the maximum depth of cut in the tool data of the tool which is selected as a tool to be used. Then, the working path generating unit 109 generates a working path by combining the calculated number of cutting operations in the tool diameter direction and the calculated number of cutting operations in the tool depth direction.

Figure 3:
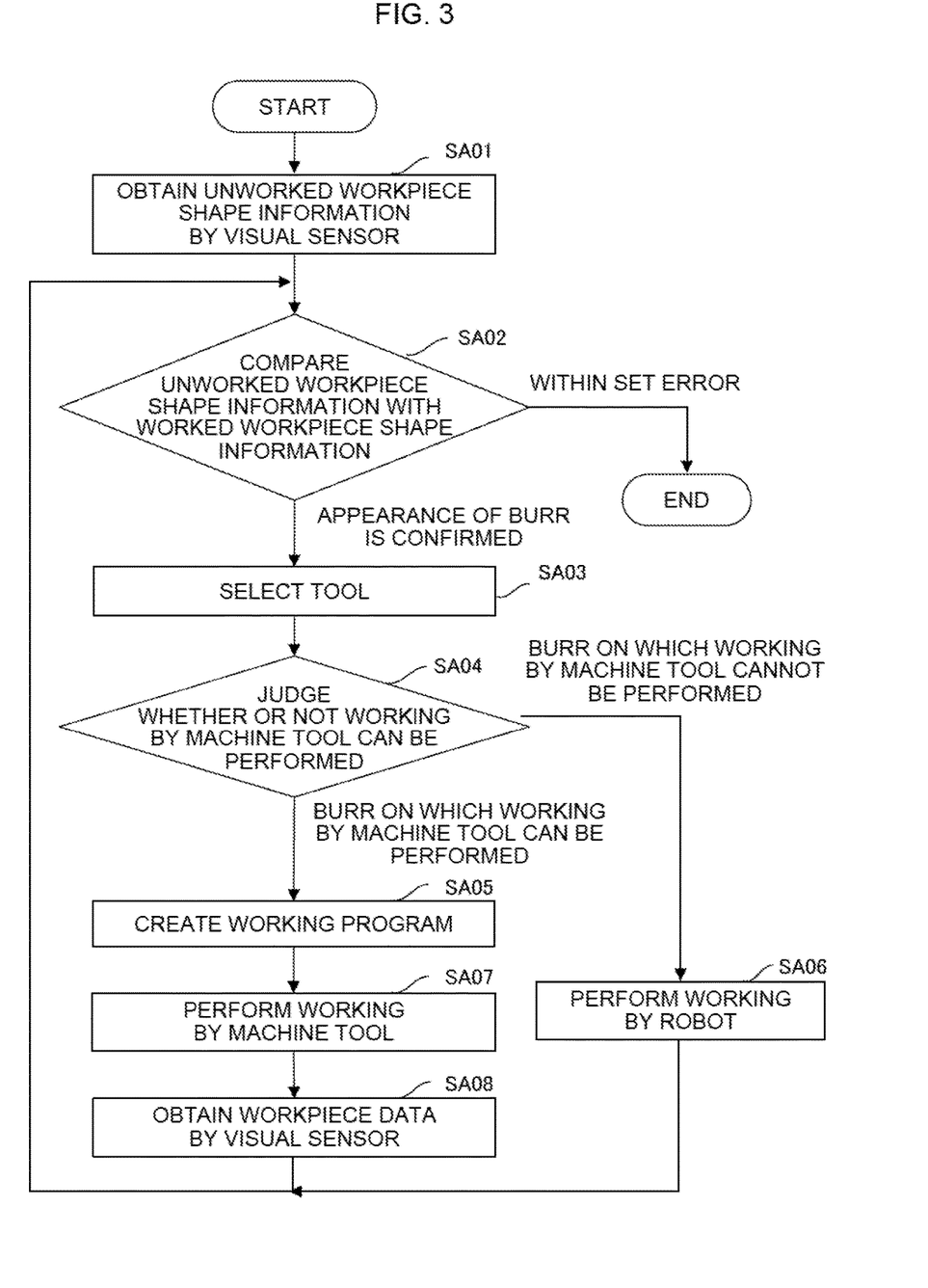
FIG. 3 is a flowchart of burring in the present invention.

By using FIG. 3, the flow of burring which is performed in the machine tool 100 according to the present invention will be described.

[Step SA01]

The visual sensor 1 obtains the shape information of unworked workpiece and records the shape information on the unworked workpiece shape information storing unit 102.

[Step SA02]

The burr information calculating unit 105 calculates a shape error by comparing the unworked workpiece shape information recorded on the unworked workpiece shape information storing unit 102 with the worked workpiece shape information recorded on the worked workpiece shape information storing unit 103 and judges whether or not the shape error exceeds the error data which is set in advance. If the shape error exceeds the error data, the burr information calculating unit 105 judges that a burr has appeared. The burr information calculating unit 105 generates burr data based on the calculated shape error, and the procedure proceeds to Step SA03.

On the other hand, if the shape error is within the error data, the processing is ended. That is, burring is ended.

[Step SA03]

The tool selecting unit 108 selects an optimum tool for burring based on the burr data recorded on the burr data storage area.

Incidentally, if the machine tool 100 does not have the tool selecting unit 108, Step SA03 is skipped, and the procedure proceeds to Step SA04.

[Step SA04]

The burr determining unit 106 determines a burr indicated by the burr data with reference to the direction and the location in which the burr has appeared. The working method judging unit 107 makes a judgment, for each piece of burr data, whether or not the burr indicated by the burr data is a burr on which working can be performed by the machine tool 100.

As for the burr judged to be a burr on which working can be performed by the machine tool 100, a working path for performing working by the machine tool 100 is generated (Step SA05). As for other burrs, since working is not performed thereon by the machine tool 100, a working path is not generated, and a robot is made to perform burring thereon (Step SA06).

[Step SA05]

The working path generating unit 109 generates a working path based on the tool selected in Step SA03, the burr data recorded on the burr data storage area, the unworked workpiece shape information, and so forth and creates a working program based on the generated working path.

Incidentally, if the machine tool 100 does not have the tool selecting unit 108, the working path generating unit 109 generates a working path which is used when an arbitrary predetermined tool is used and creates a working program based on the generated working path.

[Step SA06]

The robot performs burring on the unworked workpiece.

[Step SA07]

The machine tool 100 performs burring on the unworked workpiece in accordance with the working program created in Step SA05.

[Step SA08]

The visual sensor 1 obtains the shape information of the workpiece on which burring has been performed in Step SA06 or Step SA07 and records the shape information on the unworked workpiece shape information storing unit 102. Then, the procedure goes back to Step SA02 and the processing is repeated.

Next, an example of operation of the machine tool 100 according to the present invention will be described.

First Embodiment

Figure 4A:
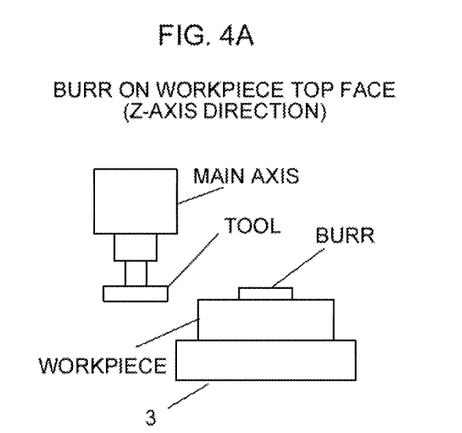
FIG. 4A is a diagram depicting an example of burring which is performed on a top face of a workpiece (a Z-axis direction) in the present invention.

In a first embodiment, an example of burring which is performed on the workpiece in which a burr depicted in FIG. 4A has appeared will be described. As depicted in FIG. 4A, in the unworked workpiece mounted on the working jig 3, the burr has appeared on the workpiece top face in the main axis direction, that is, the Z-axis direction of the machine tool 100.

First, the visual sensor 1 of the machine tool 100 obtains the unworked workpiece shape information. Next, the burr information calculating unit 105 generates burr data by comparing the unworked workpiece shape information with the worked workpiece shape information stored in the worked workpiece shape information storing unit 103 in advance. In the case of the first embodiment, the information such as the direction (the Z-axis direction) in which the burr has appeared and the location and the width of the burr is recorded as the burr data. Then, based on the stored burr data, the tool selecting unit 108 selects an optimum tool for burring.

Here, based on the burr data, the burr determining unit 106 determines that the burr in the first embodiment has appeared in the Z-axis direction, that is, the top-face direction of the workpiece and is within the movable range of the selected tool. In accordance with this determination result, the working method judging unit 107 judges that working can be performed on this burr by the machine tool 100.

In accordance with this judgment result, the working path generating unit 109 generates a working path which is used when the selected tool is used, and the machine tool 100 performs burring. As described above, the machine tool 100 can perform burring most efficiently on a burr on which working can be performed without the need for time and effort to change the position of the workpiece, for example.

Second Embodiment

Figure 4B:
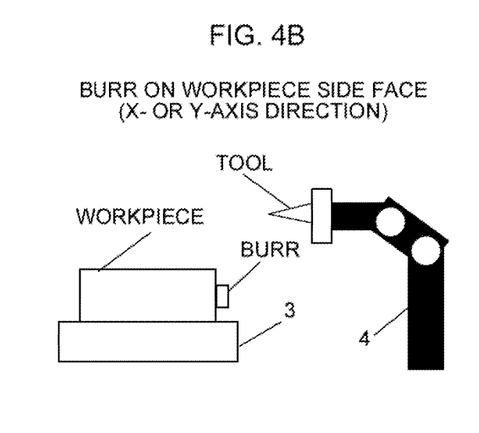
FIG. 4B is a diagram depicting an example of burring which is performed on a side face of a workpiece (an X- or Y-axis direction) in the present invention.

In a second embodiment, an example of burring which is performed on the workpiece in which a burr depicted in FIG. 4B has appeared will be described. As depicted in FIG. 4B, in the unworked workpiece mounted on the working jig 3, the burr has appeared in the X- or Y-axis direction, that is, the side-face direction of the workpiece.

The visual sensor 1 and the burr information calculating unit 105 generate burr data in a manner similar to the above-described first embodiment. In the case of the second embodiment, the information such as the direction (the X- or Y-axis direction) in which the burr has appeared and the location and the width of the burr is recorded as the burr data. Then, the tool selecting unit 108 selects a tool in a manner similar to the above-described first embodiment.

Here, the burr determining unit 106 determines that the burr in the second embodiment has appeared in the X- or Y-axis direction, that is, the side-face direction of the workpiece. In this case, extra time and effort to change the position of the workpiece, for example, is required in order to perform working on this burr by the machine tool 100. Therefore, the working method judging unit 107 judges that this burr is not an object on which working by the machine tool 100 is to be performed.

In accordance with this judgment result, the machine tool 100 does not perform working on this burr and the robot performs burring. As a result, as compared to a case where burring is performed by the machine tool 100 by spending time and effort to change the position of the workpiece, for example, it is possible to perform efficient burring by the robot.

Third Embodiment

Figure 4C:
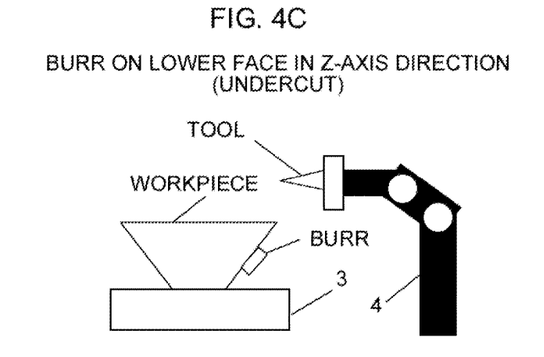
FIG. 4C is a diagram depicting an example of burring which is performed on a lower face in the Z-axis direction (undercut) in the present invention.

In a third embodiment, an example of burring which is performed on the workpiece in which a burr depicted in FIG. 4C has appeared will be described. As depicted in FIG. 4C, in the unworked workpiece mounted on the working jig 3, the burr has appeared on a lower face in the Z-axis direction, that is, in an undercut location.

The visual sensor 1 and the burr information calculating unit 105 generate burr data in a manner similar to the above-described first embodiment. In the case of the third embodiment, the information such as the direction (the Z-axis direction) in which the burr has appeared and the location (undercut) and the width of the burr is recorded as the burr data. Then, the tool selecting unit 108 selects a tool in a manner similar to the above-described first embodiment.

Here, the burr determining unit 106 determines that the burr in the third embodiment has appeared in the undercut location, though in the Z-axis direction. In this case, extra time and effort to change the position of the workpiece, for example, is required in order to perform working on this burr by the machine tool 100. Therefore, the working method judging unit 107 judges that this burr is not an object on which working by the machine tool 100 is to be performed.

In accordance with this judgment result, the machine tool 100 does not perform working on this burr and the robot performs burring. As a result, as compared to a case where burring is performed by the machine tool 100 by spending time and effort to change the position of the workpiece, for example, it is possible to perform efficient burring by the robot.

Fourth Embodiment

Figure 4D:
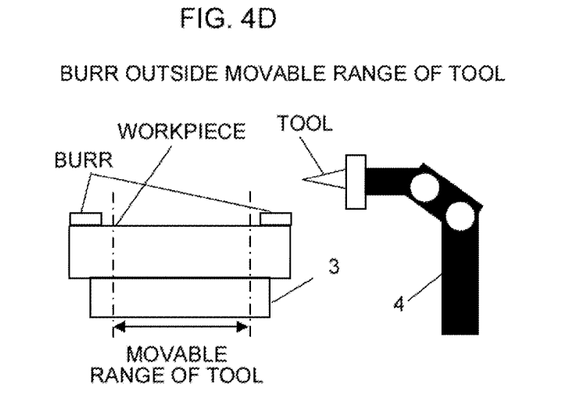
FIG. 4D is a diagram depicting an example of burring which is performed outside the movable range of a tool in the present invention.

In a fourth embodiment, an example of burring which is performed on the workpiece in which a burr depicted in FIG. 4D has appeared will be described. As depicted in FIG. 4D, in the unworked workpiece mounted on the working jig 3, the burr has appeared in a location outside the movable range of the working tool, though on a top face in the Z-axis direction.

The visual sensor 1 and the burr information calculating unit 105 generate burr data in a manner similar to the above-described first embodiment. In the case of the fourth embodiment, the information such as the direction (the Z-axis direction) in which the burr has appeared and the location (outside the tool movable range) and the width of the burr is recorded as the burr data. Then, the tool selecting unit 108 selects a tool in a manner similar to the above-described first embodiment.

Here, the burr determining unit 106 determines that the burr in the fourth embodiment has appeared in the location outside the tool movable range, though in the Z-axis direction. In this case, extra time and effort to change the position of the workpiece, for example, is required in order to perform working on this burr by the machine tool 100. Therefore, the working method judging unit 107 judges that this burr is not an object on which working by the machine tool 100 is to be performed.

In accordance with this judgment result, the machine tool 100 does not perform working on this burr and the robot performs burring. As a result, as compared to a case where burring is performed by the machine tool 100 by spending time and effort to change the position of the workpiece, for example, it is possible to perform efficient burring by the robot.

While the embodiments of the present invention have been described above, the present invention is not limited to the examples of the above-described embodiments and can be carried out in other modes by being appropriately changed or modified.

The invention claimed is:

1. A machine tool that performs burring on unworked workpiece in which a burr has appeared, the machine tool comprising:
  at least one visual sensor that takes an image of the unworked workpiece;
  a memory configured to store
    unworked workpiece shape information obtained by using the at least one visual sensor, and
    worked workpiece shape information; and
  a controller programmed to
    recognize a burr by comparing the unworked workpiece shape information stored in the memory with the worked workpiece shape information stored in the memory,
    determine the burr based on conditions including at least one of a location and a direction of the burr in the workpiece,
    decide whether or not to perform burring with a tool of the machine tool based on a determination result concerning the burr, and
    generate a working path for removing the burr judged to be a burr on which burring is to be performed with the tool, wherein
  the memory is further configured to store tool information including a shape and cutting conditions of the tool, and the controller is further programmed to
  select the tool which is used in burring based on the dimensions of the burr and the tool information,
  determine the burr based on the conditions further including the tool information of the selected tool, and
  generate the working path by calculating a number of cutting operations indicating how many times cutting operations are performed for working from the dimensions of the burr and a maximum cut amount of the selected tool.

2. The machine tool according to claim 1, wherein the controller is further programmed to determine the burr based on the conditions further including at least one of dimensions of the burr and a movable range of the tool.

3. The machine tool according to claim 1, wherein the machine tool is configured to take images of the workpiece by the at least one visual sensor from two or more directions.

4. The machine tool according to claim 3, wherein the at least one visual sensor includes a plurality of visual sensors, and
the machine tool is configured to take images of the workpiece from two or more directions by making the plurality of visual sensors take images of the workpiece from different directions.

5. The machine tool according to claim 3, wherein the at least one visual sensor is installed in a robot and configured to take images of the workpiece from two or more directions by changing a position of the robot.

6. A machine tool that performs burring on unworked workpiece in which a burr has appeared, the machine tool comprising:
  at least one visual sensor that takes an image of the unworked workpiece;
  a memory configured to store
    unworked workpiece shape information obtained by using the at least one visual sensor, and
    worked workpiece shape information;
  a controller programmed to
    recognize a burr by comparing the unworked workpiece shape information stored in the memory with the worked workpiece shape information stored in the memory,
    determine the burr based on conditions including at least one of a location and a direction of the burr in the workpiece,
    decide whether or not to perform burring with a tool of the machine tool based on a determination result concerning the burr, and
    generate a working path for removing the burr judged to be a burr on which burring is to be performed with the tool; and
  a robot configured to perform burring, wherein
the controller is further programmed to
  select the tool to be used in burring based on dimensions of the burr and tool information,
  determine the burr based on the conditions further including the tool information of the selected tool,
  generate the working path by calculating a number of cutting operations indicating how many times cutting operations are performed for working from the dimensions of the burr and a maximum cut amount of the selected tool, and
  decide whether to perform burring with the tool or to perform burring with the robot based on the determination result concerning the burr.

* * * * *